United States Patent Office
3,538,094
Patented Nov. 3, 1970

3,538,094
PRODUCTION OF CYCLIC UREA DERIVATIVES
Harro Petersen, Frankenthal, Pfalz, Germany, assignor to Badische Anilin- & Soda-Fabrik Aktiengesellschaft, Ludwigshafen (Rhine), Germany
No Drawing. Filed Aug. 16, 1967, Ser. No. 660,913
Claims priority, application Germany, Aug. 26, 1966, 1,670,136
The portion of the term of the patent subsequent to Oct. 13, 1987, has been disclaimed
Int. Cl. C07d 51/18
U.S. Cl. 260—251     5 Claims

ABSTRACT OF THE DISCLOSURE

Compounds of the formula

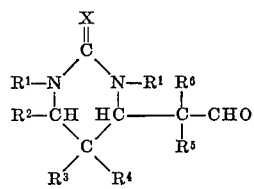

wherein $R^1$ through $R^6$ are alkyl of 1 to 4 carbon atoms, $R^2$ can also be hydrogen, and X is oxygen or sulfur are useful as textile treating agents. The compounds are prepared by reacting the corresponding 4-oxy-2-pyrimidinone with an aldehyde, e.g., isobutyraldehyde, in the presence of a strong acid.

---

This invention relates to the production of cyclic urea aldehyde derivatives by reaction of cyclic hydroxyureas or alkoxyureas with aldehydes.

It is an object of this invention to provide a new method for the production, in good yields, of cyclic urea derivatives bearing an alkyl aldehyde group as substituent in the 4-position and other substituents in the 1-, 3- and 5-positions and optionally in the 6-position from easily accessible starting materials.

A further object of this invention is to provide new cyclic urea derivatives bearing an alkyl aldehyde group as substituent in the 4-position, alkyl or alkyl aldehyde groups as substituents in 1- and 3-positions, an alkyl group in the 5-position and optionally an alkyl group in the 6-position.

In accordance with this invention these and other objects are achieved and cyclic urea derivatives having the formula:

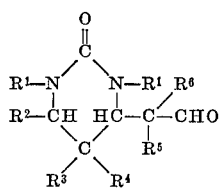 (I)

in which $R^1$ denotes an alkyl group or the radical

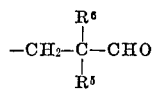

$R^2$ denotes a hydrogen atom or an alkyl group, $R^3$, $R^4$, $R^5$ and $R^6$ denote identical or different alkyl groups, are obtained by reacting cyclic urea derivatives having the general formula:

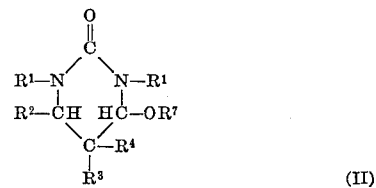 (II)

in which $R^1$, $R^2$, $R^3$ and $R^4$ have the above meanings, $R^7$ denotes a hydrogen atom or an alkyl group, with an aldehyde having the general formula:

 (III)

in which $R^5$ and $R^6$ have the above meanings, in the presence of a strong acid which is non-oxidizing under the reaction conditions and in the presence or absence of a solvent or diluent, at a temperature of from 0° to 120° C.

The process may be represented, for example for the reaction of 1,3,5,5 - tetramethyl-4-hydroxy-2-oxohexahydropyrimidine with isobutyraldehyde, by the following equation:

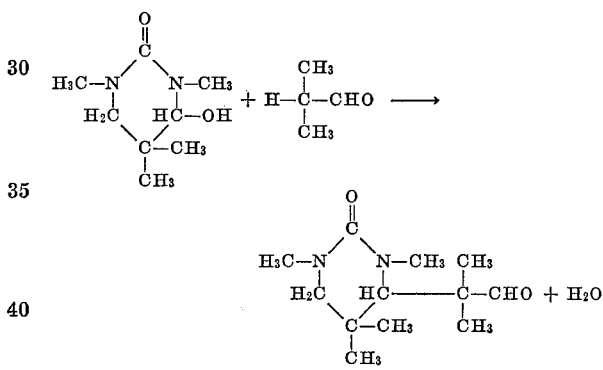

In the preferred starting materials (II) and consequently in the preferred end materials (I), the radical $R^1$ denotes an alkyl group having preferably one to four carbon atoms or the radical:

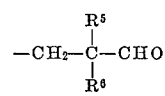

in which $R^5$ and $R^6$ denote alkyl groups having one to four carbon atoms. $R^1$, $R^2$, $R^3$, $R^4$, $R^5$ and $R^6$ may be identical or different alkyl radicals having one to four carbon atoms. $R^2$ may also denote a hydrogen atom.

The following are examples of cyclic urea derivatives which may be used as starting materials: 1,3,5,5-tetramethyl - 4 - hydroxy-2-oxohexahydropyrimidine, 1,3,5,5-tetramethyl - 4 - methoxy-2-oxohexahydropyrimidine, 1,3,5,5-tetramethyl - 4 - methoxy-6-isopropyl-2-oxohexahydriopyrimidine, 1,3-dimethyl-4-methoxy - 5 - ethyl-5-butyl - 2-oxohexahydropyrimidine, 5,5-dimethyl-2-oxo-4-methoxyhexahydropyrimidyl - 1,3 - dineopentanal, N-methyl-5,5 - dimethyl-6-isopropyl-4-hydroxy-2-oxohexahydropyrimidyl-N'-neopentanal.

In the aldehydes (III) which are preferred as starting materials, the radicals $R^5$ and $R^6$ denote identical or different alkyl groups having one to four carbon atoms. Examples of preferred aldehydes are isobutyraldehyde and 2-ethylhexanal.

Examples of strong acids which do not oxidize under the reaction conditions are hydrogen chloride, sulfuric acid, oxalic acid, benzenesulfonic acid, p-toluenesulfonic acid, or sulfonated ion exchangers. As a rule the acids are used in amounts of 1 to 100 parts by weight per mole of starting material. It is advantageous to carry out the process in the presence of solvents or diluents. For example water, ethers, such as dioxane and tetrahydrofuran, or alkanols preferably having one to four carbon atoms may be used as solvents or diluents. The solvents or diluents are used in general in an amount which is 0.1 to ten times the weight of the starting material.

The reaction of the substances is in general carried out in the theoretical molar ratio. Slight deviations from this molar ratio, for example of up to 10 mole percent, are possible. The reaction is carried out at from 0° to 120° C., preferably at from 40° to 100° C.

The process according to the invention constitutes a condensation reaction which can be accelerated by adding more acid, with or without an increase in the reaction temperature. In many cases the urea aldehydes may be obtained in the lower temperature range in the presence of larger amounts of acid. On the other hand, the reaction may be carried out at higher temperatures in the presence of less acid. The choice of temperature depends on the reactants used; the temperature may be lower when more acid is added, and vice versa.

The new compounds having the Formula I which can be prepared by the process have textile finishing properties. They are also valuable intermediates for the production of aminoaldehydes, aminocarboxylic acids and amino resins. Thus for example cotton cloth may be impregnated therewith from an aqueous suspension for example at the rate of 80 to 200 grams of said new compounds per kilogram of fibrous material, dried and treated at elevated temperature, for example at 120° to 160° C., in a condensation unit and thereby given a crease-resist finish.

The invention is further illustrated by the following examples, in which parts are by weight.

EXAMPLE 1

344 parts of 2-oxo-1,3,5,5-tetramethyl-4-hydroxyhexahydropyromidine is dissolved in 1000 parts of water and in a stirred apparatus provided with good reflux cooling means 160 parts of isobutyraldehyde and 50 parts of concentrated hydrochloric acid are added. The reaction mixture is heated for eight hours at refluxing temperature and then neutralized with caustic soda solution. The mixture is shaken with chloroform, the chloroform phase is evaporated under subatmospheric pressure and the residue is fractionally distilled in a high vacuum. The main fraction has a boiling point range of from 150° to 168° C. at 0.5 to 1 mm. Hg. 260 parts of 2-oxo-1,3,5,5-tetramethylhexahydropyrimidyl-4-isobutyraldehyde is obtained.

Analysis.—Calc'd for $C_{12}H_{22}O_2N_2$ (percent) (226): C, 63.7; H, 9.7; N, 12.4. Found (percent): C, 63.4; H, 9.7; N, 12.1.

EXAMPLE 2

326 parts of 2-oxo-4-methoxy-5,5-dimethylhexahydropyrimidyl-1,3-dineopentanal is mixed with 300 parts of dioxane and 72 parts of isobutyraldehyde in a stirred apparatus and 60 parts of 50% aqueous sulfuric acid is added while stirring. The reaction mixture is heated for five hours at 90° to 95° C. The refluxing temperature is about 70° to 75° C. at the beginning of the reaction and rises in the course of two hours to about 90° to 95° C. The mixture is cooled and neutralized with caustic soda solution. The reaction product formed is shaken with chloroform and the chloroform solution is dried with sodium sulfate and evaporated under subatmospheric pressure. 324 parts of crude product is obtained. The trialdehyde is isolated by fractional distillation under a high vacuum. The pure product has a boiling point of from 208° to 221° C. at a pressure of 0.5 mm. Hg and crystallizes after having stood for several days.

Analysis.—Calc'd for $C_{20}H_{34}O_4N_2$ (percent) (366); C, 65.6; H, 9.3; N, 7.65. Found: C, 65.3; H, 9.4; N, 7.6.

The compound has the following structural formula:

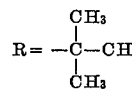

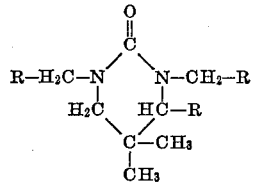

I claim:
1. A cyclic urea derivative having the formula:

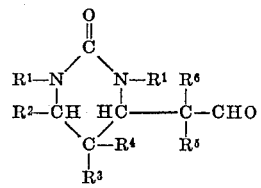

in which $R^1$ is alkyl of 1 to 4 carbon atoms, $R^2$ is hydrogen or alkyl of 1 to 4 carbon atoms, $R^3$ is alkyl of 1 to 4 carbon atoms, $R^4$ is alkyl of 1 to 4 carbon atoms, $R^5$ is alkyl of 1 to 4 carbon atoms, $R^5$ is alkyl of 1 to 4 carbon atoms, and $R^6$ is alkyl of 1 to 4 carbon atoms.

2. A cyclic urea as in claim 1 wherein $R^5$ and $R^6$ are methyl.

3. A process for the production of cyclic urea derivatives having the formula:

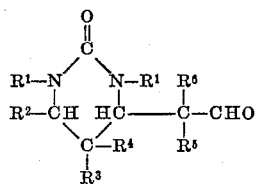

in which $R^1$ is alkyl of 1 to 4 carbon atoms or the radical

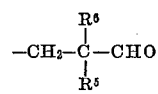

$R^2$ is hydrogen or alkyl of 1 to 4 carbon atoms, $R^3$ and $R^4$ are alkyls of 1 to 4 carbon atoms, $R^5$ and $R^6$ are alkyls of 1 to 4 carbon atoms which comprises: reacting a cyclic urea having the formula:

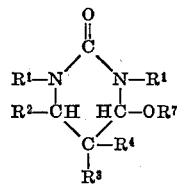

in which $R^1$, $R^2$, $R^3$ and $R^4$ have the meanings given above, $R^7$ is hydrogen or lower alkyl with a theoretical molar amount of an aldehyde having

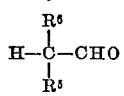

in which $R^5$ and $R^6$ have the meanings given above in the presence of a strong acid which does not oxidize under the reaction conditions and at a temperature of from 0° to 120° C.

4. A process as in claim 3 wherein said process is carried out in the presence of a solvent selected from the group consisting of water, dioxane, tetrahydrofuran, and alkanols of 1 to 4 carbon atoms.

5. A process as claimed in claim 3 carried out at from 40° to 100° C.

References Cited

UNITED STATES PATENTS

| | | | |
|---|---|---|---|
| 2,957,028 | 10/1960 | Brannock | 260—601 |
| 3,335,187 | 8/1967 | Hargis et al. | 260—601 |

FOREIGN PATENTS

| | | |
|---|---|---|
| 655,066 | 1/1963 | Canada. |

OTHER REFERENCES

Blicke: Organic Reactions, vol. I, Wiley Press, 1942, pp. 306, 327, 332.

ALEX MAZEL, Primary Examiner

RAYMOND V. RUSH, Assistant Examiner

U.S. Cl. X.R.

252—8.8

PO-1050
(5/69)

UNITED STATES PATENT OFFICE
CERTIFICATE OF CORRECTION

Patent No. 3,538,094    Dated November 3, 1970

Inventor(s) Harro Petersen

It is certified that error appears in the above-identified patent and that said Letters Patent are hereby corrected as shown below:

Column 2, line 61, "hydriopyrimidine" should read -- hydropyrimidine --.

Column 3, line 49, "hydropyromidine" should read -- hydropyrimidine --.

SIGNED AND SEALED
FEB 2 1971

(SEAL)
Attest:

Edward M. Fletcher, Jr.
Attesting Officer

WILLIAM E. SCHUYLER, JR.
Commissioner of Patents